(12) United States Patent
Oberlin et al.

(10) Patent No.: US 12,448,895 B2
(45) Date of Patent: Oct. 21, 2025

(54) TURBINE BLADE AND METHOD FOR PRODUCING A TURBINE BLADE

(71) Applicant: Siemens Energy Global GmbH & Co. KG, Bayern (DE)

(72) Inventors: Raphael Oberlin, Wesel (DE); Ulrich Stanka, Mülheim an der Ruhr (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 0 days.

(21) Appl. No.: 18/727,081

(22) PCT Filed: Dec. 20, 2022

(86) PCT No.: PCT/EP2022/087077
§ 371 (c)(1),
(2) Date: Jul. 6, 2024

(87) PCT Pub. No.: WO2023/134983
PCT Pub. Date: Jul. 20, 2023

(65) Prior Publication Data
US 2025/0109692 A1 Apr. 3, 2025

(30) Foreign Application Priority Data
Jan. 14, 2022 (DE) .................. 10 2022 200 369.1

(51) Int. Cl.
*F01D 5/22* (2006.01)
*B23P 15/02* (2006.01)
*F01D 11/08* (2006.01)

(52) U.S. Cl.
CPC .............. *F01D 5/225* (2013.01); *B23P 15/02* (2013.01); *F01D 11/08* (2013.01); *F05D 2230/10* (2013.01); *F05D 2250/75* (2013.01)

(58) Field of Classification Search
CPC . F01D 5/225; F01D 5/20; F01D 11/08; F01D 11/12; F01D 11/122; F01D 11/127;
(Continued)

(56) References Cited

U.S. PATENT DOCUMENTS

| 1,482,031 | A | | 1/1924 | Parsons | |
|---|---|---|---|---|---|
| 2,265,592 | A | * | 12/1941 | Allen | F01D 5/3038 29/889.7 |
| 3,014,270 | A | * | 12/1961 | Eccles | B21C 23/16 29/889.721 |

(Continued)

FOREIGN PATENT DOCUMENTS

| CN | 105697068 A | | 6/2016 |
|---|---|---|---|
| DE | 19542083 C1 | * | 1/1997 |

(Continued)

OTHER PUBLICATIONS

English machine translation of DE-19542083-C1, Jan. 10, 2025.*

(Continued)

*Primary Examiner* — Christopher Verdier
(74) *Attorney, Agent, or Firm* — Wolter Van Dyke Davis, PLLC

(57) ABSTRACT

A turbine blade having an aerofoil, wherein the aerofoil extends along a longitudinal axis, and having a blade tip, wherein, at the blade tip, a lower V limb of an element of V-shaped cross section extends transversely with respect to the longitudinal axis from a leading edge to a trailing edge, and having an upper V limb which has an outer surface, wherein the longitudinal axis is at an angle of 80° to 100°, in particular 90°, with respect to the outer surface. A method for producing such a turbine blade having a blade tip, in which method the blade tip is produced by removal of material from a wedge-shaped shroud.

9 Claims, 2 Drawing Sheets

(58) Field of Classification Search
CPC .... F04D 29/164; F04D 29/324; F04D 29/384; B23P 15/02; Y10T 29/49995; F05D 2250/75; F05D 2230/10; F05D 2230/11; F05D 2230/12; F05D 2230/13
See application file for complete search history.

(56) References Cited

U.S. PATENT DOCUMENTS

| | | | |
|---|---|---|---|
| 4,767,273 A | 8/1988 | Partington | |
| 6,632,069 B1* | 10/2003 | Naljotov | F01D 11/10 415/173.5 |
| 2016/0130965 A1* | 5/2016 | Yamaguchi | F01D 1/04 415/13 |
| 2019/0360350 A1 | 11/2019 | Mori | |
| 2020/0400733 A1 | 12/2020 | Carcia | |

FOREIGN PATENT DOCUMENTS

| | | | | |
|---|---|---|---|---|
| DE | 102017205794 A1 | | 10/2018 | |
| WO | WO-9942704 A1 | * | 8/1999 | ............ F01D 11/001 |

OTHER PUBLICATIONS

English machine translation of CN 105697068A, Jan. 10, 2025.*
English machine translation of WO-9942704-A1, May 4, 2025.*
PCT International Search Report and Written Opinion of International Searching Authority mailed Mar. 28, 2023 corresponding to PCT International Application No. PCT/EP2022/087077 filed Jan. 14, 2022.
German Search Report corresponding to German Application No. 10 2022 200 369.1 [English machine translation attached].

* cited by examiner

TURBINE BLADE AND METHOD FOR PRODUCING A TURBINE BLADE

CROSS REFERENCE TO RELATED APPLICATIONS

This application is the US National Stage of International Application No. PCT/EP2022/087077 filed 20 Dec. 2022, and claims the benefit thereof. The International Application claims the benefit of German Application No. DE 10 2022 200 369.1 filed 2022 Jan. 14.

FIELD OF INVENTION

The invention relates to a blade tip of a turbine blade, which is lighter in weight owing to its design, and to a production method.

BACKGROUND OF INVENTION

Turbine blades in turbines, such as steam turbines or gas turbines, are subject to high mechanical centrifugal forces.

Any weight saving therefore results in huge advantages. This is the case particularly for shrouds or shroud plates of turbine blades. In particular, shrouds have a high weight at the distal end of a turbine blade.

One possibility is to use materials which are lighter in weight, but this leads to higher costs.

SUMMARY OF INVENTION

It is therefore an object of the invention to provide a solution for the above problem.

The object is achieved by a blade tip as claimed and a method as claimed.

The dependent claims list further advantageous measures which can be combined with one another as desired in order to obtain further advantages.

BRIEF DESCRIPTION OF THE DRAWINGS

In the figures

DETAILED DESCRIPTION OF INVENTION

The figures and the description only illustrate exemplary embodiments of the invention.

Figure 1:
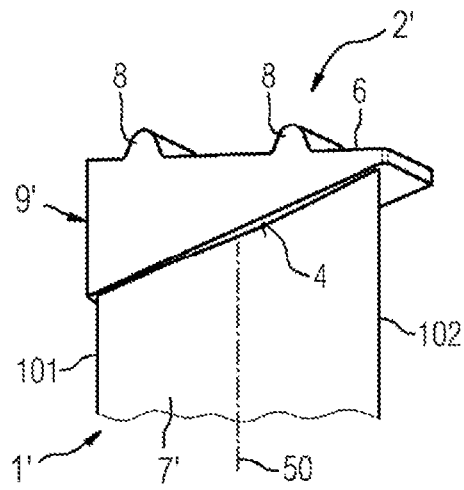
FIGS. 1 and 2 show a shroud according to the prior art.

FIG. 1 shows a shroud 2' according to the prior art, which adjoins a blade aerofoil 7' and constitutes a distal end of a turbine blade 1'.

The turbine blade 1' has a longitudinal axis 50. The longitudinal axis 50 runs perpendicularly to an outer surface 6 of the shroud 2' or represents a radial direction, when the turbine blade 1' is installed in a rotor.

Figure 2:
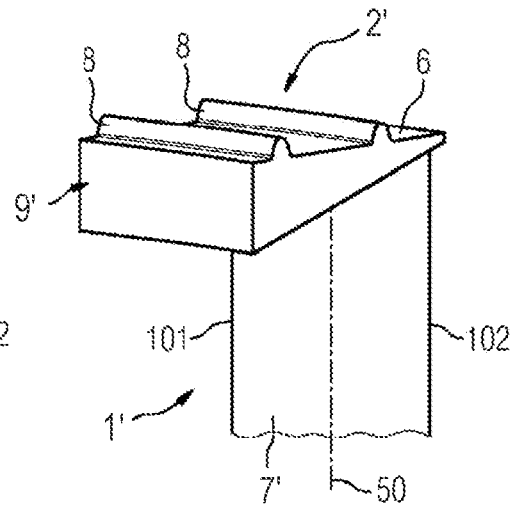

The blade tip 9' is formed at the end of the blade aerofoil 7', the blade tip, as also illustrated in FIG. 2, being wedge-shaped and solid and extending at least over the entire width of the blade aerofoil 7', i.e., from a leading edge 101 as far as a trailing edge 102 of the blade aerofoil 7'.

An inner surface 4 of the shroud 2' runs at an acute angle to the longitudinal axis 50, as seen from the leading edge 101.

The inner surface 4 is a boundary to the flow path, in particular to the steam path.

The outer surface 6 of the shroud 2' has sealing fins 8.

Figure 3:
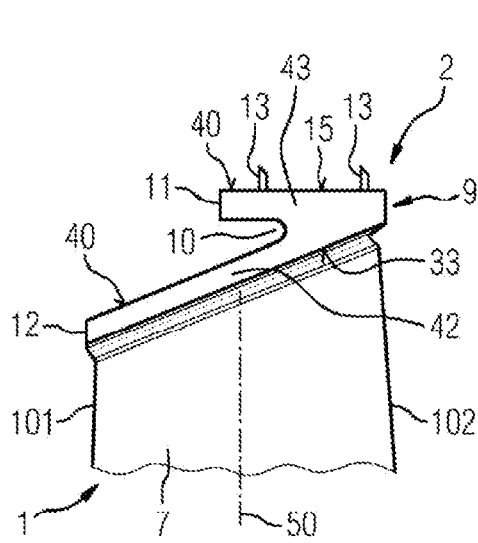
FIGS. 3, 4 and 5 show a shroud according to the invention.

The invention is illustrated in more detail in FIG. 3. The blade aerofoil 7 of a turbine blade 1 extends similarly to the blade aerofoil 7' according to FIG. 1 and also has a longitudinal axis 50, and a leading edge 101 and a trailing edge 102.

However, the blade tip 9 now has a V shape, with an inner surface 33 running at an acute angle to the longitudinal axis 50, in particular at the same angle as the inner surface 4 of the shroud 2' to the longitudinal axis 50 according to the prior art (FIGS. 1 and 2).

The V shape has two V limbs 42, 43, wherein in particular a lower V limb 42 is longer than the other, upper V limb 43.

The longer, lower V limb 42 extends at least over the entire width of the blade aerofoil 7.

The longer V limb 42 has an end face 12 in the region of the leading edge 101.

The plane in which the end face 12 lies is preferably at the same distance from the leading edge 101 or from a trailing edge 102 as a front end face of the shroud 2' according to the prior art (FIGS. 1 and 2) from the leading edge 101 or a trailing edge 102.

The upper side 40 of the lower V limb 42 preferably runs parallel to the inner surface 33.

The V shape forms an undercut 10.

The longitudinal axis 50 runs perpendicularly to the outer surface 15 of the shroud 2, which is designed according to the invention, or to the upper V limb 43.

Sealing fins 13 are in turn present on the outer or outermost surface 15 of the shroud 2.

However, the sealing fins 8 are cross-sectionally wedge-shaped or triangular.

The sealing fins 13 are pointed at least at the end and are preferably rectangular in cross section. This is also illustrated in more detail in FIG. 3.

The sealing fins 13 are in particular machined from a blank, in particular by turning, i.e., are formed integrally with the shroud, but may also be attached as thin plates or build-up welds, i.e., have been attached or fitted separately.

The turbine blade 1, in particular for a steam turbine, is cast or forged and/or machined from a block.

Figure 5:
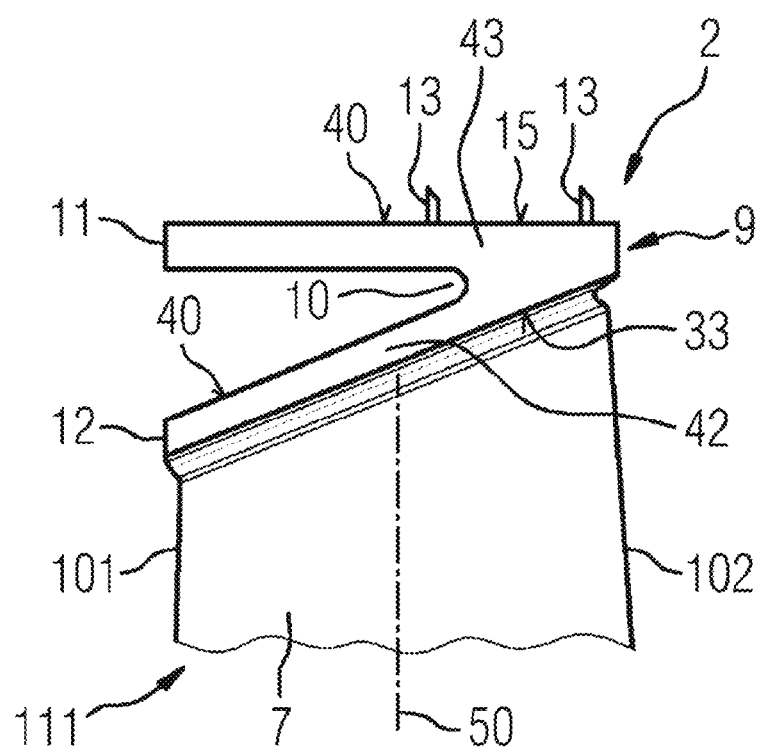

An end face 11 of the upper V limb 43 does not extend here over the entire width of the blade aerofoil 7 and preferably lies approximately centrally between the leading edge 101 and trailing edge 102 (FIG. 3) but may also extend over the entire width of the turbine blade 111, i.e., as far as the plane of the end face 12 (FIG. 5).

Also in the embodiment according to FIG. 5, the lower V limb 42 is longer than the upper V limb 43, even if they both extend as far as the plane of the end face 12. This is necessitated by the approximately asymmetrical arrangement of the V limbs 42, 43.

A blade from the prior art (FIGS. 1 and 2) may also be formed by material machining according to the invention.

Figure 4:
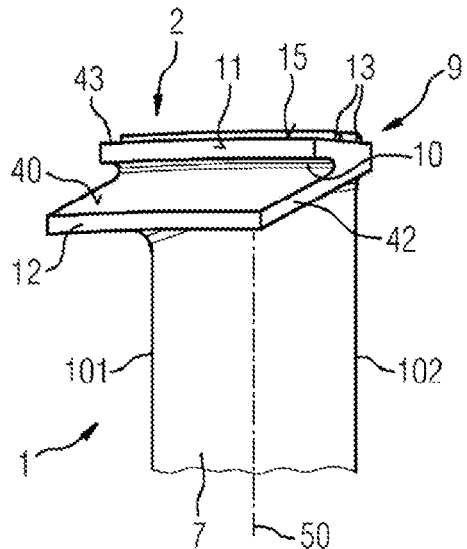

It is also possible to remove the shroud 2' according to FIGS. 1 and 2 and to attach a new shroud 2 (FIGS. 3, 4 and 5), in particular by additive processes.

The invention claimed is:

1. A turbine blade, comprising:
   a blade aerofoil, wherein the blade aerofoil extends along a longitudinal axis, and
   a blade tip,
   wherein when viewed in a cross sectional view, the blade tip comprises a V-shaped element comprising a lower V limb that extends transversely with respect to the longitudinal axis from a leading edge as far as a trailing edge, and further comprises an upper V limb comprising an outer surface that appears straight when viewed in the cross sectional view, wherein the longitudinal axis is at an angle of 80° to 100°, to the outer surface, and wherein the upper V limb extends from an end of the lower V limb that is disposed at the trailing edge toward the leading edge, and wherein the upper V limb does not reach the leading edge.

2. The turbine blade as claimed in claim 1,
further comprising sealing fins disposed on the outer surface of the blade tip.

3. The turbine blade as claimed in claim 2,
wherein respective ends of the sealing fins are pointed or wedge-shaped.

4. The turbine blade as claimed in claim 2,
wherein the sealing fins have been separately attached to the outer surface of the blade tip.

5. The turbine blade as claimed in claim 2,
in which the sealing fins are formed integrally with a shroud.

6. The turbine blade as claimed in claim 1,
in which the lower V limb runs at an acute angle to the longitudinal axis.

7. A method for producing the turbine blade comprising the blade tip as claimed in claim 1, comprising:
producing the blade tip by removing material from a wedge-shaped shroud.

8. The turbine blade as claimed in claim 1,
wherein the longitudinal axis is at an angle of 90° to the outer surface.

9. The turbine blade as claimed in claim 1,
in which the upper V limb does not extend over half of an extent from the leading edge as far as the trailing edge.

* * * * *